(12) United States Patent
Takamiya (10) Patent No.: US 9,094,545 B2
(45) Date of Patent: Jul. 28, 2015

(54) IMAGE PROCESSING APPARATUS, INFORMATION PROCESSING SYSTEM, METHOD OF CONTROLLING THE SAME, AND STORAGE MEDIUM

(75) Inventor: Hiroyoshi Takamiya, Fujisawa (JP)

(73) Assignee: CANON KABUSHIKI KAISHA (JP)

( * ) Notice: Subject to any disclaimer, the term of this patent is extended or adjusted under 35 U.S.C. 154(b) by 904 days.

(21) Appl. No.: 12/703,481

(22) Filed: Feb. 10, 2010

(65) Prior Publication Data

US 2010/0208297 A1 Aug. 19, 2010

(30) Foreign Application Priority Data

Feb. 10, 2009 (JP) ................................. 2009-028531

(51) Int. Cl.
H04N 1/00 (2006.01)

(52) U.S. Cl.
CPC ......... *H04N 1/00222* (2013.01); *H04N 1/0097* (2013.01); *H04N 1/00225* (2013.01); *H04N 1/00416* (2013.01); *H04N 2201/0015* (2013.01); *H04N 2201/0094* (2013.01)

(58) Field of Classification Search
None
See application file for complete search history.

(56) References Cited

U.S. PATENT DOCUMENTS

| | | | |
|---|---|---|---|
| 6,459,499 B1 | 10/2002 | Tomat | |
| 7,139,094 B2 * | 11/2006 | Blasio et al. | 358/1.16 |
| 7,990,580 B2 * | 8/2011 | Motoyoshi | 358/403 |
| 8,355,170 B2 * | 1/2013 | Tian | 358/1.9 |
| 2001/0014908 A1 * | 8/2001 | Lo et al. | 709/203 |
| 2003/0043423 A1 * | 3/2003 | Johnston et al. | 358/505 |
| 2003/0048303 A1 | 3/2003 | Mesa et al. | |
| 2004/0061907 A1 * | 4/2004 | Nakaota | 358/474 |
| 2005/0078336 A1 | 4/2005 | Ferlitsch | |
| 2005/0174603 A1 * | 8/2005 | Iinuma et al. | 358/1.16 |
| 2006/0017941 A1 * | 1/2006 | Momozono et al. | 358/1.1 |
| 2006/0077459 A1 | 4/2006 | Matsueda | |
| 2006/0262359 A1 * | 11/2006 | Lee | 358/474 |
| 2007/0183002 A1 * | 8/2007 | Corona | 358/474 |
| 2008/0289051 A1 | 11/2008 | Osamura et al. | |
| 2009/0231637 A1 * | 9/2009 | Kemmochi et al. | 358/474 |

FOREIGN PATENT DOCUMENTS

| | | |
|---|---|---|
| JP | 2001-217980 A | 8/2001 |
| JP | 2003-198819 A | 7/2003 |
| JP | 2006-087022 A | 3/2006 |
| KR | 10-2007-0037417 A | 4/2007 |

OTHER PUBLICATIONS

Korean Office Action issued in Korean counterpart application No. KR10-2010-0011868, issued Aug. 31, 2012.

* cited by examiner

*Primary Examiner* — Hilina K Demeter
(74) *Attorney, Agent, or Firm* — Rossi, Kimms & McDowell LLP (57) ABSTRACT

An image processing apparatus which is capable of performing scanning of an original, using a plurality of scan settings stored in an information processing apparatus, without necessitating a dedicated server or a complicated user operation before execution of the scanning. An image processing apparatus (MFP) receives and displays host PC names and scan setting names transmitted from host PCs on a display section. The MFP finalizes a host PC name selected by a user from the host PC names and one of scan setting names associated with the finalized host PC name, which is selected by the user. The MFP sends a scan execution instruction to the host PC to instruct the same to execute scanning using a scan setting associated with the finalized scan setting name.

14 Claims, 10 Drawing Sheets

IMAGE PROCESSING APPARATUS, INFORMATION PROCESSING SYSTEM, METHOD OF CONTROLLING THE SAME, AND STORAGE MEDIUM

BACKGROUND OF THE INVENTION

1. Field of the Invention

The present invention relates to an image processing apparatus, such as a scanner or an MFP (Multi-Function Peripheral), provided with a function of sending a scanned image to an information processing apparatus, such as a PC, an information processing system, and a method of controlling the image processing apparatus.

2. Description of the Related Art

An image processing apparatus, such as a scanner or an MFP, sometimes employs a pseudo-push scanning method when transmitting an image scanned by a scanning section.

The pseudo-push scanning method is a method in which an MFP, for example, sends a request for execution of pull scanning by the MFP itself to a host PC or the like information processing apparatus having a pull-scan driver, and the host PC or the like causes the MFP to carry out scanning.

An image scanned by the MFP is sent e.g. to the host PC, and the host PC or the like stores the received image in its own memory or the like based on image storage destination information set in advance. This procedure enables the image scanned by the MFP to be sent to the desired host PC or the like and stored therein according to an instruction from the MFP, whereby push scanning by the MFP is realized in a pseudo fashion.

The pseudo-push scanning method is more advantageous than a method in which an MFP carries out push scanning in a standalone fashion (see Japanese Patent Laid-Open Publication No. 2003-198819), in that it is not required to support a plurality of communication protocols on an MFP side, which contributes to cost reduction. Further, a complicated network configuration can be dispensed with, and therefore usability is improved.

Conventionally, in a case where pseudo-push scanning is executed by an MFP, a user selects a desired host PC name from ones displayed on a display screen of the MFP.

However, in a case where the MFP carries out scanning in the pseudo-push scanning method using a scan setting set in the host PC, even if the host PC has a plurality of settings for the scan function, only a single one of them is used as one associated with the host PC. For this reason, to enable the MFP to execute scanning according to different conditions (resolution, a storage destination folder, etc.) of a host PC, the host PC-side scan setting associated with execution of the scanning by the MFP is required to be changed depending on the different conditions.

To solve this problem, i.e. to enable the MFP to use a plurality of scan settings stored in the host PC, there has been proposed a technique using a scan server (see Japanese Patent Laid-Open Publication No. 2001-217980).

However, the technique disclosed in Japanese Patent Laid-Open Publication No. 2001-217980 requires provision of a server and a user operation for registering a plurality of scan settings stored in a host PC, as job templates in the server in advance, which makes the processing complicated.

SUMMARY OF THE INVENTION

The present invention provides an image processing apparatus with improved usability, which is capable of performing scanning of an original, using a plurality of scan settings stored in an information processing apparatus, without necessitating a dedicated server or a complicated user operation before execution of the scanning.

In a first aspect of the present invention, there is provided an image processing apparatus that includes a scanning section for scanning an image on an original, and is communicably connected to a plurality of information processing apparatuses, comprising a reception unit configured to receive identification information items respectively indicative of the information processing apparatus, and scan setting names, which are transmitted from the information processing apparatuses, a first display unit configured to display the identification information items respectively indicative of the information processing apparatuses received by the reception unit on a display section, a first finalizing unit configured to finalize an identification information item selected by a user from the identification information items displayed on the display section, a second display unit configured to display on the display section a plurality of scan setting names transmitted from an information processing apparatus associated with the identification information item finalized by the first finalizing unit, a second finalizing unit configured to finalize a scan setting name selected by the user from the scan setting names displayed on the display section, a first transmission unit configured to transmit a scan execution instruction to the information processing apparatus associated with the identification information item finalized by the first finalizing unit, to instruct the information processing apparatus to execute scanning using a scan setting associated with the scan setting name finalized by the second finalizing unit.

In a second aspect of the present invention, there is provided an information processing system comprising an image processing apparatus that includes a scanning section for scanning an image on an original, the image processing apparatus comprising a reception unit configured to receive identification information items respectively indicative of the information processing apparatus, and scan setting names, which are transmitted from the information processing apparatuses, a first display unit configured to display the identification information items respectively indicative of the information processing apparatuses received by the reception unit on a display section, a first finalizing unit configured to finalize an identification information item selected by a user from the identification information items displayed on the display section, a second display unit configured to display on the display section a plurality of scan setting names transmitted from an information processing apparatus associated with the identification information item finalized by the first finalizing unit, a second finalizing unit configured to finalize a scan setting name selected by the user from the scan setting names displayed on the display section, and a first transmission unit configured to transmit a scan execution instruction to the information processing apparatus associated with the identification information item finalized by the first finalizing unit, to instruct the information processing apparatus to execute scanning using a scan setting associated with the scan setting name finalized by the second finalizing unit, and a plurality of information processing apparatuses, wherein the information processing apparatus associated with the identification information item finalized by the first finalizing unit is configured to execute a scan execution process based on the scan execution instruction.

In a third aspect of the present invention, there is provided a method of controlling an image processing apparatus that includes a scanning section for scanning an image on an original, and is communicably connected to a plurality of information processing apparatuses, comprising receiving identification information items respectively indicative of the information processing apparatus, and scan setting names, which are transmitted from the information processing apparatuses, displaying the received identification information items respectively indicative of the information processing apparatuses on a display section, finalizing an identification information item selected by a user from the identification information items displayed on the display section, displaying on the display section a plurality of scan setting names transmitted from an information processing apparatus associated with the finalized identification information item, finalizing a scan setting name selected by the user from the scan setting names displayed on the display section, and transmitting a scan execution instruction to the information processing apparatus associated with the finalized identification information item, to instruct the information processing apparatus to execute scanning using a scan setting associated with the finalized scan setting name.

In a fourth aspect of the present invention, there is provided a computer-readable storage medium storing a program for causing a computer to execute a method of controlling an image processing apparatus that includes a scanning section for scanning an image on an original, and is communicably connected to a plurality of information processing apparatuses, wherein the method comprises receiving identification information items respectively indicative of the information processing apparatus, and scan setting names, which are transmitted from the information processing apparatuses, displaying the received identification information items respectively indicative of the information processing apparatuses on a display section, finalizing an identification information item selected by a user from the identification information items displayed on the display section, displaying on the display section a plurality of scan setting names transmitted from an information processing apparatus associated with the finalized identification information item, finalizing a scan setting name selected by the user from the scan setting names displayed on the display section, and transmitting a scan execution instruction to the information processing apparatus associated with the finalized identification information item, to instruct the information processing apparatus to execute scanning using a scan setting associated with the finalized scan setting name.

In a fifth aspect of the present invention, there is provided a computer-readable storage medium storing a program which, when loaded into a computer, causes the computer to become the image processing apparatus of any one of claims 1 to 5 or the information processing system of any one of claim 6 or 7.

According to the present invention, it is possible to improve the usability of the image processing apparatus by eliminating the necessity of a dedicated server and a complicated user operation before execution of scanning of an original, in a case where the image processing apparatus executes the scanning, using a plurality of scan settings stored in an information processing apparatus.

Further features of the present invention will become apparent from the following description of exemplary embodiments with reference to the attached drawings.

DETAILED DESCRIPTION OF THE EMBODIMENTS

The present invention will now be described in detail below with reference to the accompanying drawings showing embodiments thereof.

Figure 1:
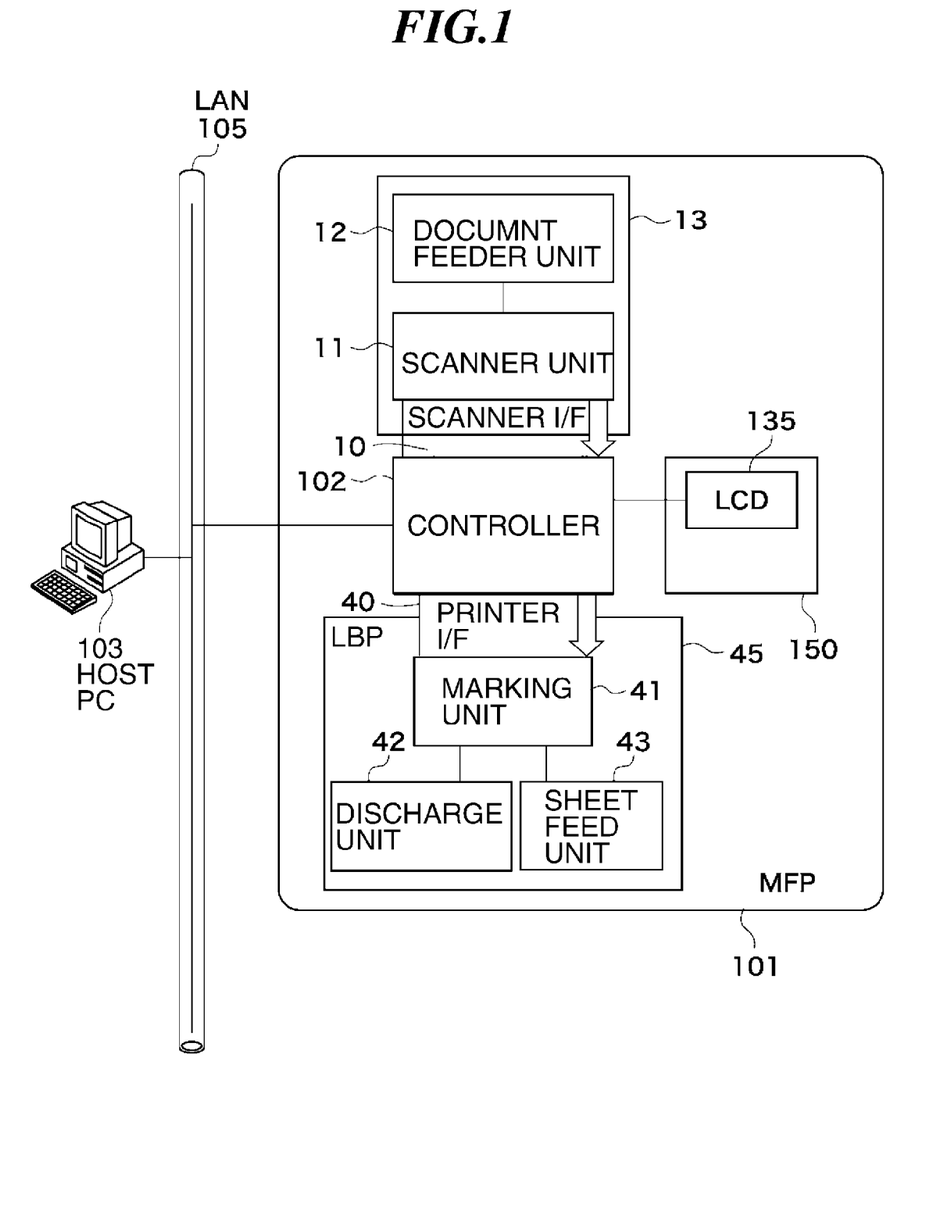
FIG. 1 is a diagram of the system configuration of an MFP as an image processing apparatus according to an embodiment of the present invention.

FIG. 1 is a diagram of the system configuration of an MFP (Multi-Function Peripheral) as an image processing apparatus according to an embodiment of the present invention.

As shown in FIG. 1, the MFP 101 of the present embodiment is comprised of a scanning section 13, an image output section (LBP: Laser Beam Printer) 45, a controller 102, and an operation and display section 150, and is communicably connected to an information processing apparatus, such as a host PC 103, via a network 105, such as a LAN.

The scanning section 13 is comprised of a scanner unit 11 having the function of scanning an image from an original, and a document feeder unit 12 having the function of feeding originals. The scanning section 13 optically scans an image from an original and converts the scanned image into image data.

The image output section 45 is comprised of a sheet feed unit 43 provided with a plurality of types of recording sheet cassettes, a marking unit 41 having the function of transferring and fixing image data onto each recording sheet, and a discharge unit 42 having the function of discharging printed recording sheets from the apparatus after sorting or stapling the printed recording sheets.

The controller 102 provides a copying function by controlling the scanning section 13 to scan image data from an original, and controlling the image output section 45 to output the image data onto a recording sheet. Further, the controller 102 provides a function of sending the image data read by the scanning section 13 e.g. to the host PC 103 via the network 105.

The operation and display section 150 includes a display section 135 comprised of an LCD and hard keys, and provides user interface for operating the MFP 101.

Figure 2:
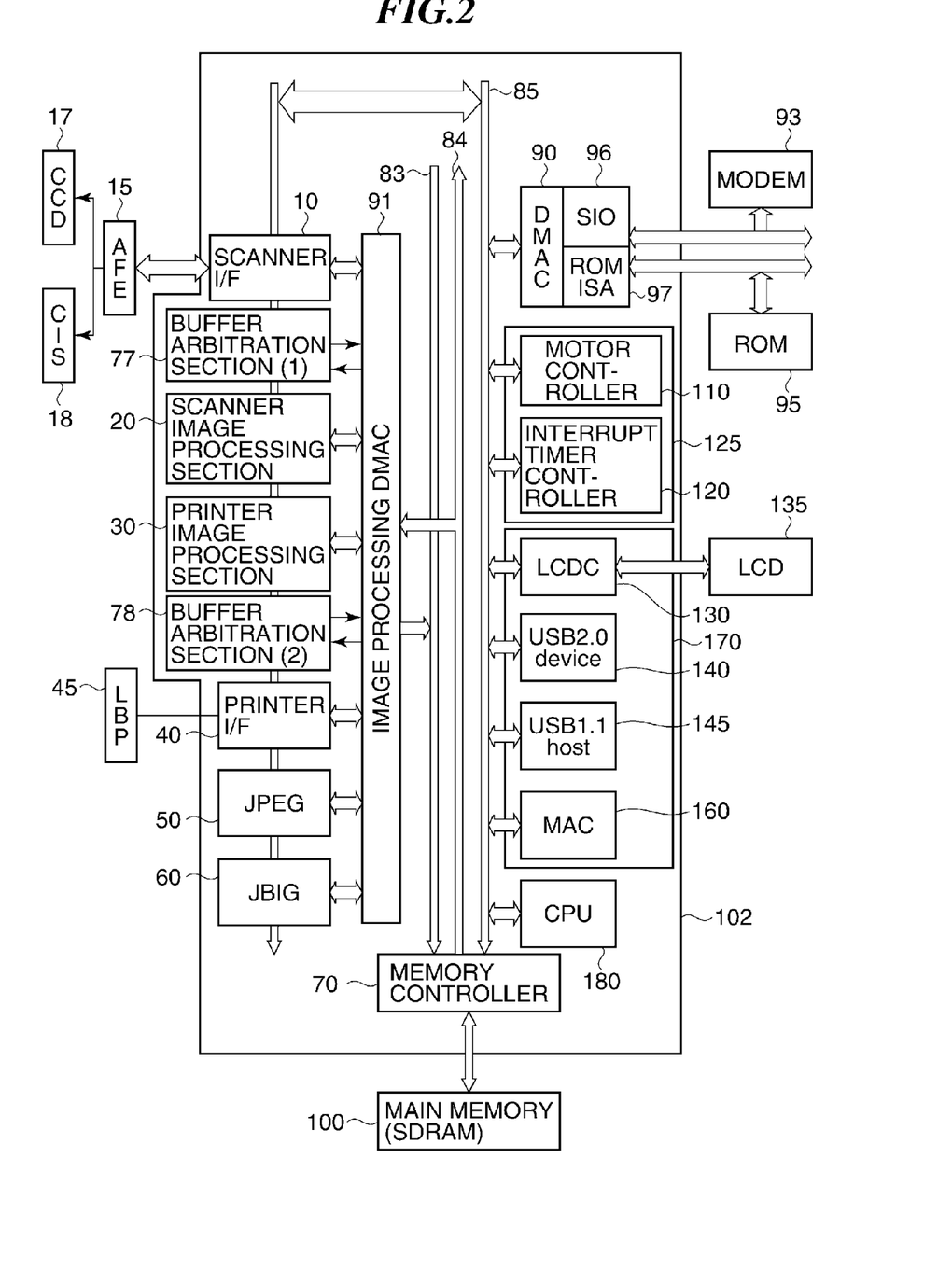
FIG. 2 is a block diagram of a controller.

FIG. 2 is a block diagram of the controller 102.

Referring to FIG. 2, a scanner interface 10 is connected to a CCD (charge coupled device) 17 and a CIS (contact image sensor) 18 via an AFE (analog front end) 15. The scanner interface 10 inputs scanned image signals from the CCD 17 or the CIS 18, and the input image data is DMA-transferred by a memory controller 70 to be loaded in a main memory 100.

A scanner image processing section 20 performs image processing on the image data loaded in the main memory 100 through the processing by the scanner interface 10, according to an image processing operation mode (color copying, monochrome copying, color scanning, monochrome scanning, etc.).

A buffer arbitration section (1) 77 arbitrates between requests for writing and reading, when transfer of data is performed between the scanner interface 10 and the scanner image processing section 20 via a ring buffer area in the main memory 100.

A printer image processing section 30 performs area edit processing and resolution conversion of the input image data, and delivers the processed image data for printout. A printer interface 40 outputs the image data obtained by the image processing to the image output section (LBP) 45.

A buffer arbitration section (2) 78 arbitrates between requests for writing and reading, when transfer of data is performed between the printer image processing section 30 and the printer interface 40 via a ring buffer area in the main memory 100. Although the buffer arbitration sections (1) and (2) 77, 78 have the same basic construction, control methods thereof are different from each other depending on the use thereof.

Each of a JPEG module 50 and a MG module 60 executes image data compression/expansion processes compliant with respective predetermined standards.

The memory controller 70 is connected to a first bus 83 and a second bus 84 related to image processing, and a third bus 85 related to computer processing, for controlling transfer of data for writing and reading the data into and from the main memory (SDRAM) 100.

A DMAC (DMC controller) 90 cooperates with the memory controller 70, and is connected to a MODEM 93 via a SIO (Serial Input/Output) 96 and a ROM 95 via a ROMISA 97. The DMAC 90 generates and sets predetermined address information for DMA control of transmission and reception of data between an external device and an interface control section 170, and the main memory 100.

An image processing DMAC 91 cooperates with the memory controller 70 to thereby generate and set predetermined address information for DMA control of transmission and reception of data between the interfaces 10 and 40 and the image processing sections 20 and 30, and the main memory 100.

For example, the image processing DMAC 91 generates address information for use in DMA transfer of image data read in via the scanner interface 10, to the main memory 100, on a DMA channel-by-DMA channel basis, depending on the CCD 17 or the CIS 18. Further, the image processing DMAC 91 functions as a unit for providing DMA control between the interfaces 10 and 40 and the image processing sections 20 and 30, and the main memory 100, in cooperation with the memory controller 70. For example, the image processing DMAC 91 performs processing for DMA transfer of image data loaded in the main memory 100 to the scanner image processing section 20.

The ROM 95 stores control parameters, control program data, and the like, associated with the CCD 17 and the CIS 18. This makes it possible to input image data according to each of different data output formats of the CCD 17 and the CIS 18, and therefore, provision of dedicated interface circuits can be dispensed with.

The first bus 83 is capable of sending data read out from the main memory 100 to the image processing-related sections (10 to 60). The second bus 84 is capable of sending data read out from the image processing-related sections (10 to 60) to the main memory 100. In other words, the first bus 83 and the second bus 84 perform transmission and reception of image data between the image processing-related sections (10 to 60) and the main memory 100, in a manner paired with each other. The third bus 85 is a computer processing-related bus to which are connected a CPU 180, the interface control section 170, a mechatronic control section 125, control registers, not shown, of the image processing-related sections (10 to 60), and the DMAC 90.

The mechatronic control section 125 includes a motor controller 110 and an interrupt timer controller 120 that performs timing control for driving the motor and for synchronization of processes executed by the image processing-related sections.

An LCD controller 130 is a unit that provides display control for displaying various settings, a processing state, etc. on the display section 135. USB interfaces 140 and 145 provide interface for connection to peripheral devices. A MAC (media access) controller 160 includes a physical network interface, not shown, and is connected to the network 105 via a cable, for controlling timing for sending data to a connected device. The MAC controller 160 is also used to communicate with external apparatuses (the host PC 103, a client PC, etc.) e.g. via the network 105. The CPU 180 controls the overall operation of the MFP 101.

Figure 3:
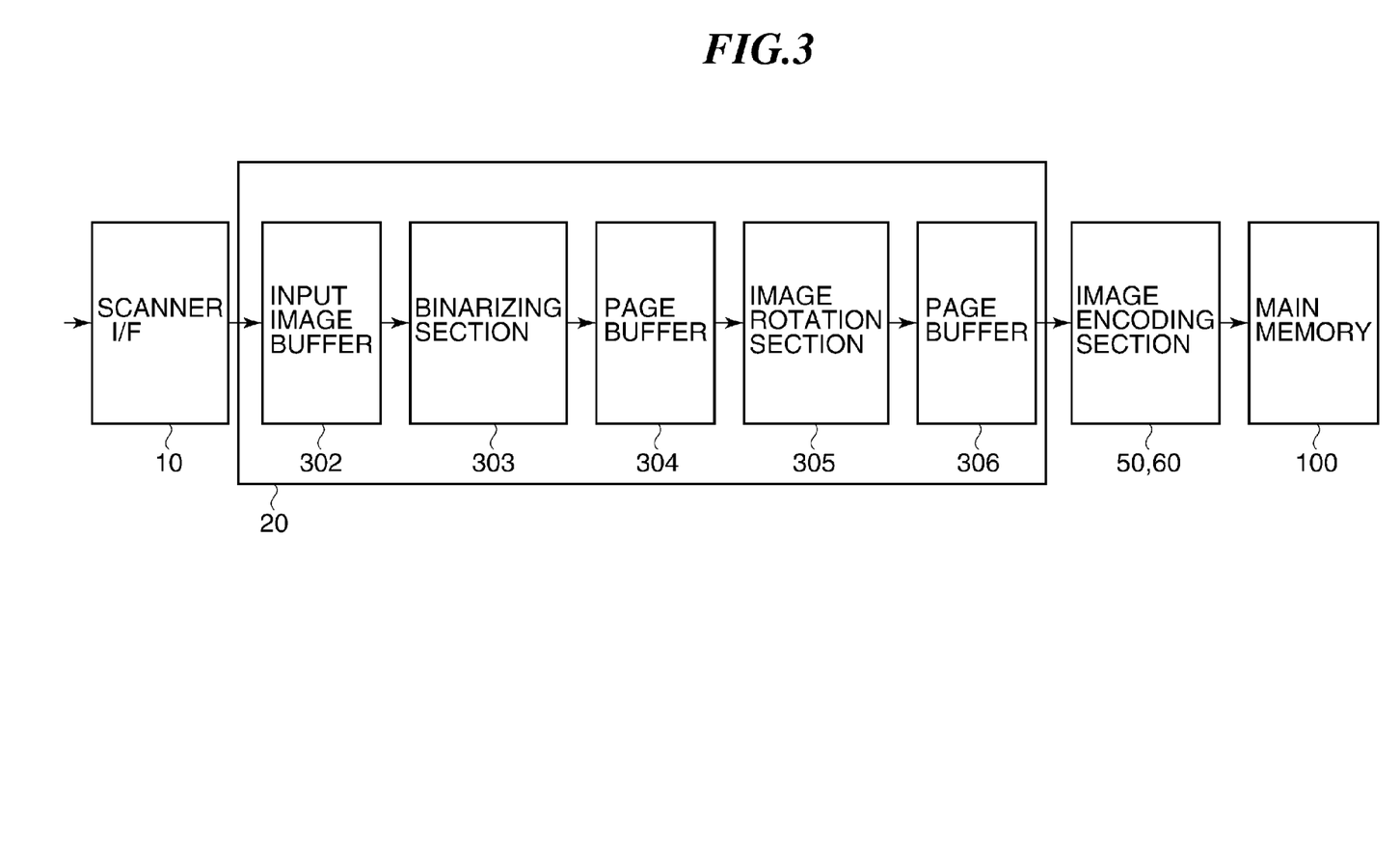
FIG. 3 is a block diagram of processing sections, which is useful in explaining a process for accumulating scanned images read by a CCD or a CIS of the MFP.

Next, a process for accumulating scanned images read by the CCD 17 or the CIS 18 of the MFP 101 will be described with reference to FIG. 3.

Image data from an original scanned by the CCD 17 or the CIS 18 is subjected to processing including A/D conversion by the AFE 15, and is then accumulated in an input image buffer 302 of the scanner image processing section 20 via the scanner interface 10. At this time, the image data is treated as multi-valued data in which each pixel is expressed by one byte, for monochrome data, and by three bytes for color data. It should be noted that the input image buffer 302 is not required to store image data of one whole page, but it suffices to store image data of a unit for binarization by a binarizing section 303 at the next stage.

The binarizing section 303 converts multi-valued image data into binary image data on a fixed-data amount basis, and stores the binary image data in a page buffer 304.

Then, the CPU 180 configures settings (e.g. of rotation/nonrotation, rotational direction and angle, etc.) for control of image rotation via the third bus 85 based on user operation on the operation and display section 150 and then causes an image rotation section 305 to perform image rotation according to the settings. The image data subjected to image rotation is stored in a page buffer 306. Thereafter, the binary image data stored in the page buffer 306 is encoded by the JBIG module 60 (when the image data is monochrome) or by the JPEG module 50 (when the image data is color), and then is stored in the main memory 100. The JBIG module 60 and the JPEG module 50 constitute an image encoding section.

In the present embodiment, in a case where pull scanning and pseudo-push scanning are performed, almost all image processing is executed by the host PC 103, and therefore scanned image data is immediately stored in the main memory 100 without being subjected to image rotation by the image rotation section or image encoding. Depending on the hardware configuration of the MFP 101, scanned image data can be stored in an HDD.

Next, a description will be given of processing for transmitting an image from the MFP 101.

The CPU 180 executes a control program stored in the ROM 95, for realizing protocols and transmission specifications. Specifically, the CPU 180 performs processing, such as encoding of image data accumulated in the main memory 100 and adding packet headers to the encoded image data, and then sends the image data e.g. to the host PC 103 from the third bus 85 via the network 105 such as the LAN. In the present embodiment, communication for execution of pseudo-push scanning is performed using TCP/IP on the TCP/IP network. A scanning sequence for pseudo-push scanning will be described hereinafter.

Next, the configuration of a scan setting for a driver of the host PC 103 will be described with reference to FIG. 4.

In a case where pull scanning is performed by the host PC 103, a screen 501 on which are arranged custom scan buttons 502 to 505 and a configuration button 506 is displayed on a display section, not shown, of the host PC 103. The custom scan buttons 502 to 505 are assigned respective custom scan settings each provided for defining how scan is to be performed. When one of the custom scan buttons 502 to 505 is depressed, the MFP 101 starts scanning an original and sends scanned image data to the host PC 103.

Figure 4:
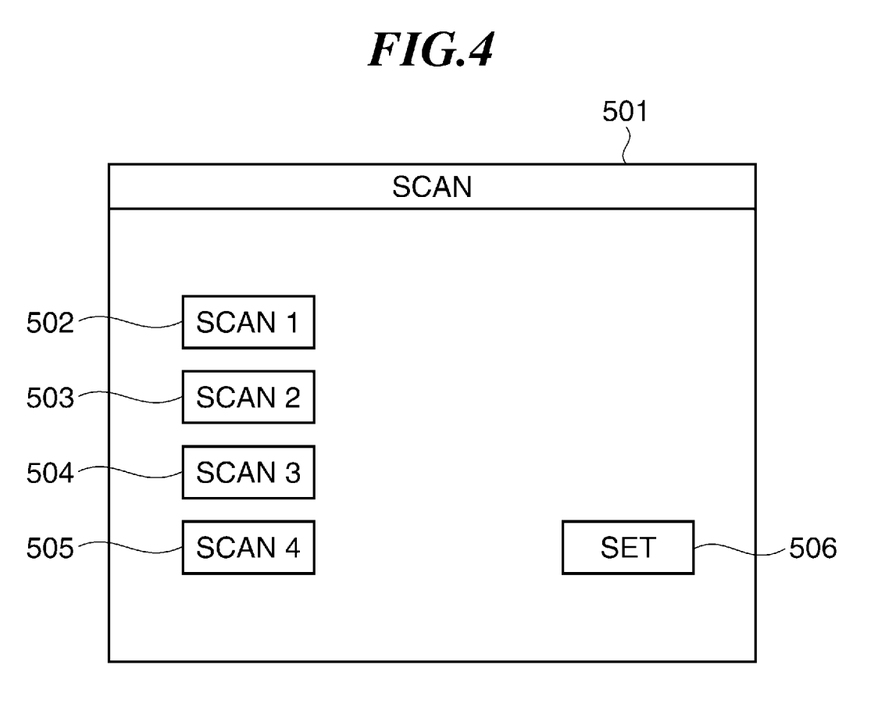
FIG. 4 is a view of an example of a screen displayed on a display section of a host PC in a case where pull scanning is carried out from the host PC.
Figure 5:
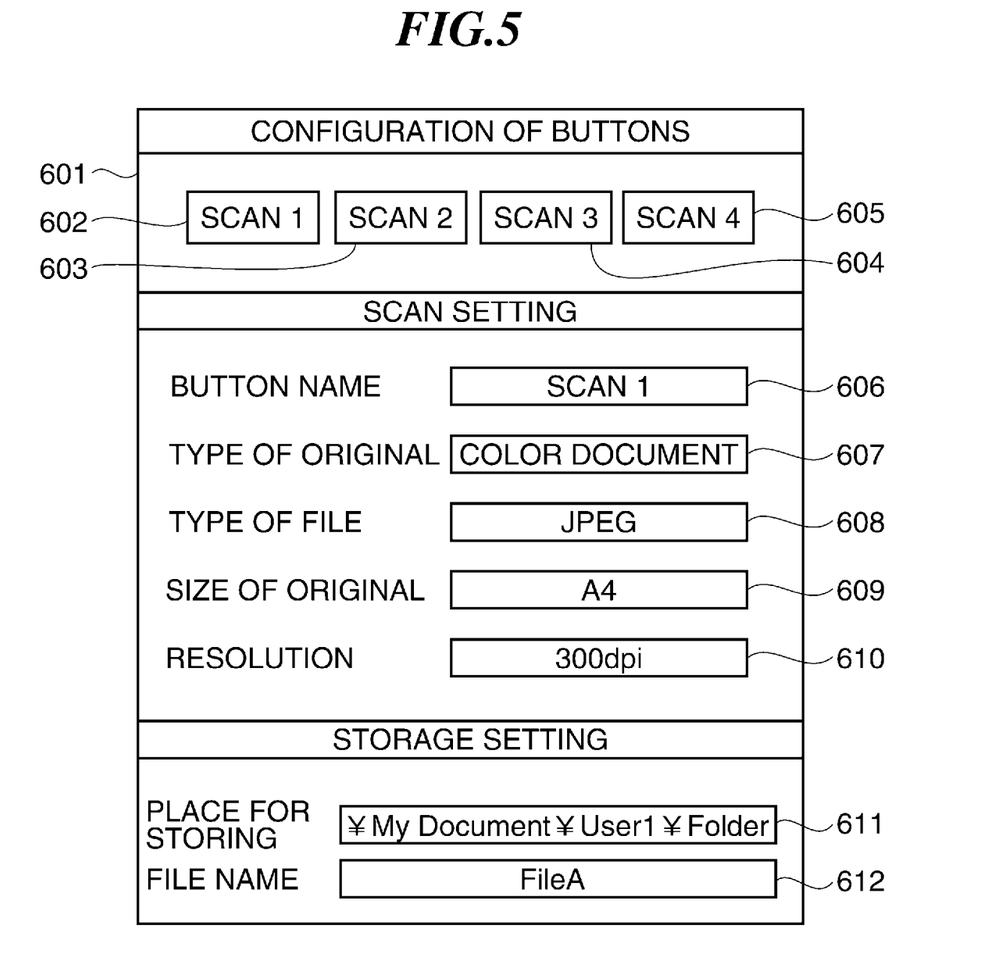
FIG. 5 is a view of an example of a screen displayed on the display section of the host PC when a configuration button is depressed on the screen shown in FIG. 4.

When the configuration button 506 is depressed, a screen 601 shown in FIG. 5 is displayed on the display section of the host PC 103. On the screen 601, there are arranged a plurality of buttons 602 to 605, and e.g. by depressing the button 602, customization of the custom scan button 502, which currently has a name "scan 1", is enabled. This selecting operation causes settings input by the user in advance or default settings to be displayed in respective fields 606 to 612. The user can change the settings as desired.

For example, in the field 606, it is possible to change the name itself of an associated custom scan button. As described hereinafter, when a button name is changed in the field 606, a button name after the change is also reflected on the display section 135 of the MFP 101.

In the field 607, it is possible to select a type of an original for scanning. Selectable types include "color document" and "monochrome document". In the field 608, it is possible to designate a file format, such as JPEG, TIFF, PDF, or BMP, for file storage. In the field 609, it is possible to designate a size of an original to be scanned.

In the field 610, it is possible to designate a resolution of an image to be scanned, and in the field 611, it is possible to designate a place (path) for storing the image. In the field 612, it is possible to designate a name of a file storing this customization.

As described above, image processing is performed on scanned image data, based on settings in the respective fields 607 to 610, whereby a desired image is obtained. Although the image processing may be performed by either of the MFP 101 and the host PC 103, it is assumed in the present embodiment that the host PC 103 performs the image processing.

In pseudo-push scanning, a request for starting pull scanning, i.e. a request for causing depression of one of the custom scan buttons 502 to 505 in FIG. 4 is sent from the MFP 101 to the host PC 103, whereby transmission of an image is realized.

Next, the basic scanning sequence between the MFP 101 and the host PC 103 will be described with reference to FIG. 6.

Figure 6:
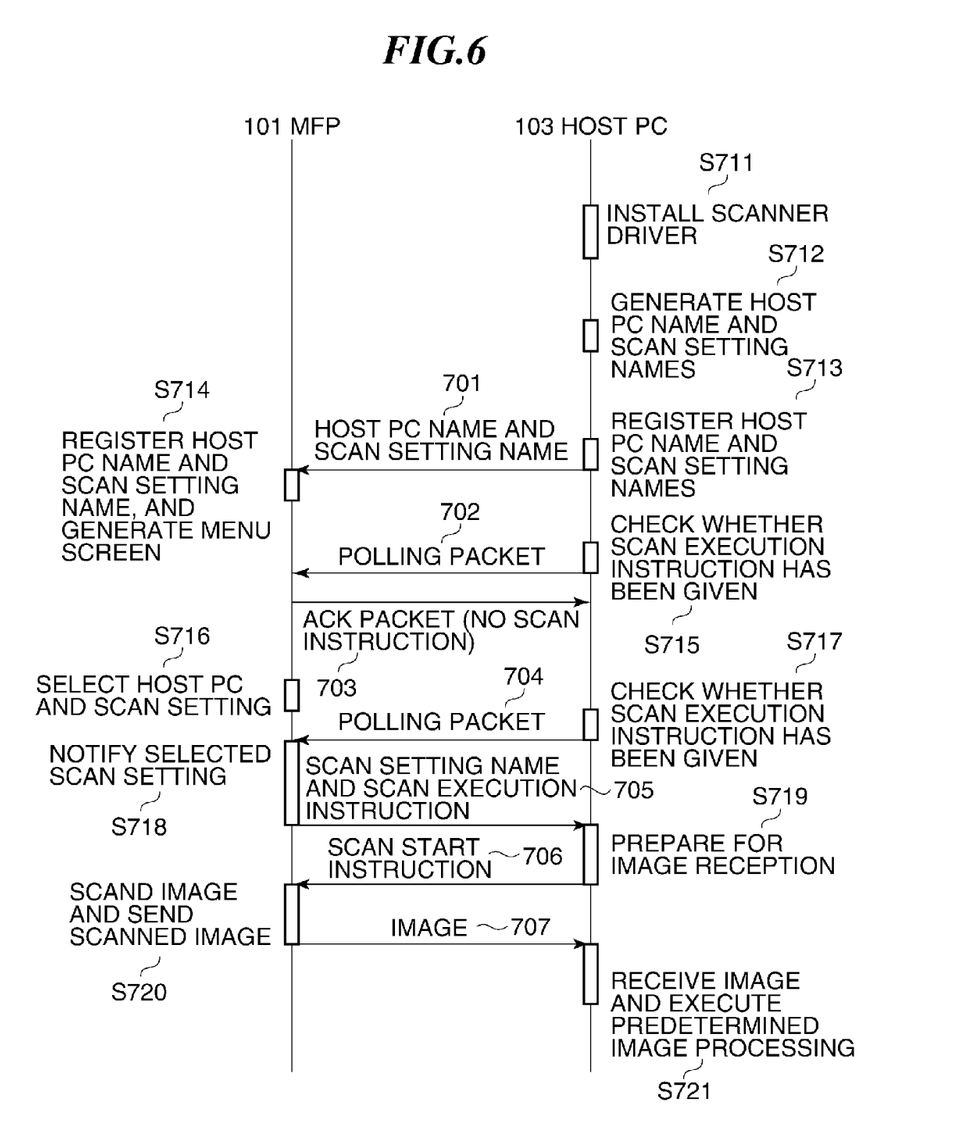
FIG. 6 is a diagram useful in explaining a basic scanning sequence between the MFP and the host PC.

Referring to FIG. 6, in a step S711, a pull scan driver is installed in the host PC 103. By execution of this step, the host PC 103 is enabled to perform pull scanning.

In a step S712, the host PC 103 generates a host PC name and scan setting names. This step is executed e.g. in timing synchronous with installation of the driver in the host PC 103, starting of the host PC 103, or changing of scan settings for the driver. The step is also executed in timing of switching between log-on users in a case where the host PC 103 has a multi-user interface, which is provided e.g. by the Microsoft Windows (registered trademark).

In a step S713, the host PC 103 sends information 701 on the host PC name (identification information) and the scan setting names generated in the step S712 to the MFP 101. The scan setting names are associated with the buttons 602 to 605 in FIG. 5, respectively, which correspond to the custom scan buttons 502 to 505 in FIG. 4, respectively. Further, when a plurality of buttons for scan settings exist, like the custom scan buttons 502 to 505 appearing in FIG. 4, the same number of items of information 701 as the number of the buttons are transmitted.

In a step S714, the MFP 101 receives the information 701 transmitted from the host PC 103 in the step S713. The MFP 101 registers the received information 701 and displays the registered information 701 as menu options on the display section 135.

In a step S715, it is checked by the host PC 103 whether or not an instruction for executing a scan operation has been given from the operation and display section 150 of the MFP 101. In this step, a polling packet 702 for checking a state of the MFP 101 related to execution of scanning is sent from the host PC 103 to the MFP 101.

Upon reception of the polling packet 702, the MFP 101 sends response information (Ack packet) 703 to the host PC 103 so as to notify the same of its state related to execution of scanning. In this case, when a scan execution instruction, referred to hereinafter, is not to be sent to the host PC 103, the MFP 101 sends the response information 703 indicating "no scan instruction". The polling packet is periodically sent from the host PC 103 to the MFP 101 as long as the scanner driver is operable.

Figure 7:
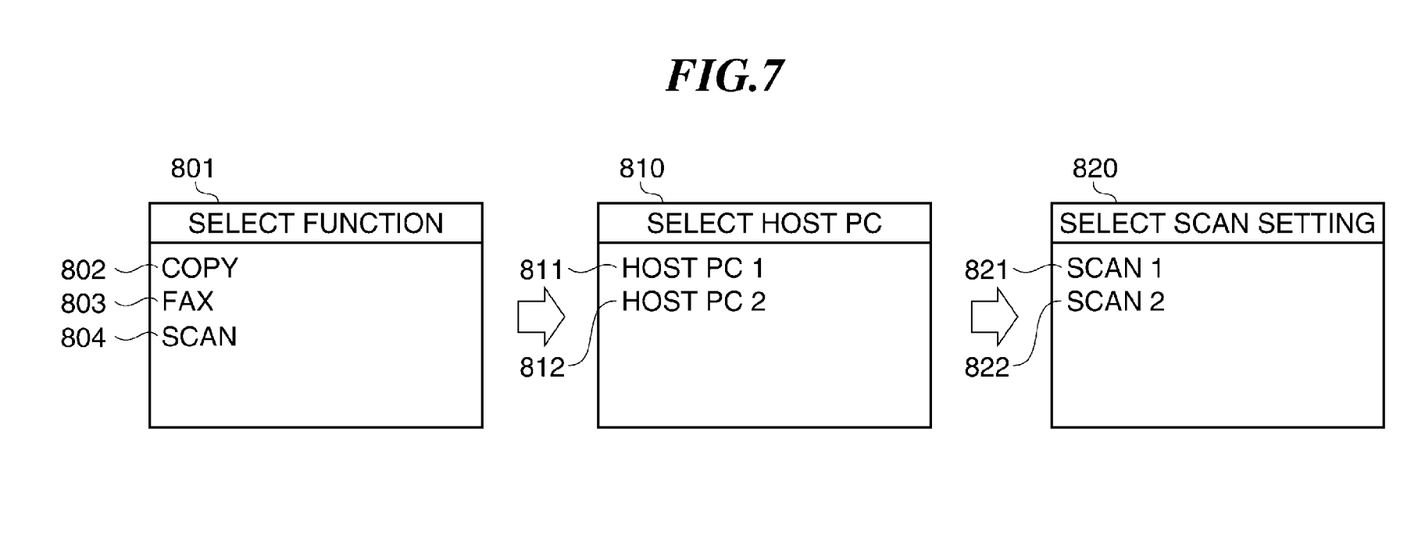
FIG. 7 is a view of an example of selection screens sequentially displayed on the display section of the MFP after each associated one of menu options for pseudo-push scanning is selected through a user operation.

In a step S716, the MFP 101 starts scanning. In this step, the MFP 101 displays screens (shown in FIG. 7) for the user to select a host PC and a scan setting on the display section 135. Referring to FIG. 7, when the user selects one of COPY 802, FAX 803, and SCAN 804 on a selection screen 801 through key operation on the operation and display section 150, a selection screen 810 is displayed a description of which will be given hereinafter.

In a step S717, similarly to the step S715, it is checked from the host PC 103 whether or not an instruction for scan execution has been given from the operation and display section 150 of the MFP 101. In this step, a polling packet 704 is sent from the host PC 103 to the MFP 101.

Similarly to the polling packet 702, the polling packet 704 is sent to check the state of the MFP 101 related to execution of scanning.

In a step S718, the MFP 101 determines a host PC to which the scan execution instruction is to be sent and a scan setting set in the host PC, based on a host PC name and a scan setting name selected in the step S716.

If the host PC 103 as the sender of the received polling packet 704 does not correspond to the host PC name selected in the step S716, the MFP 101 sends the response information (Ack packet) 703 indicating "no scan instruction" to the host PC 103 in the same manner as in the step S715 described above.

On the other hand, if the host PC 103 as the sender of the received polling packet 704 corresponds to the host PC name selected in the step S716, the MFP 101 sends response information (Ack packet) 705 to the host PC 103. The response information 705 contains the scan setting name selected in the step S716 and a scan execution instruction (pull scan start request).

In a step S719, the host PC 103 receives the information 705 and starts pull scanning. At this time, the host PC 103 determines, based on the contents of the received response information 705, which type of pull scanning should be executed according to a selected one of the custom scan buttons 502 to 505 in FIG. 4, indicative of respective customizations of pull scanning, as described hereinabove. Then, the host PC 103 sends scan start instruction information 706 to the MFP 101 to instruct the same to perform scanning according to the result of the determination.

In a step S720, the MFP 101 causes the scanning section 13 to start scanning of an original based on the scan start instruction information 706 sent from the host PC 103, and sends image data 707 scanned from the original to the host PC 103. The step S720 is an example of processing executed by a second transmission unit of the present invention.

In a step S721, the host PC 103 performs image processing on the received image data 707 based on parameters of the designated scan setting, and then stores the processed image data in a folder designated in the field (place for storing) 611 in a "storage setting" area in FIG. 5.

Figure 8:
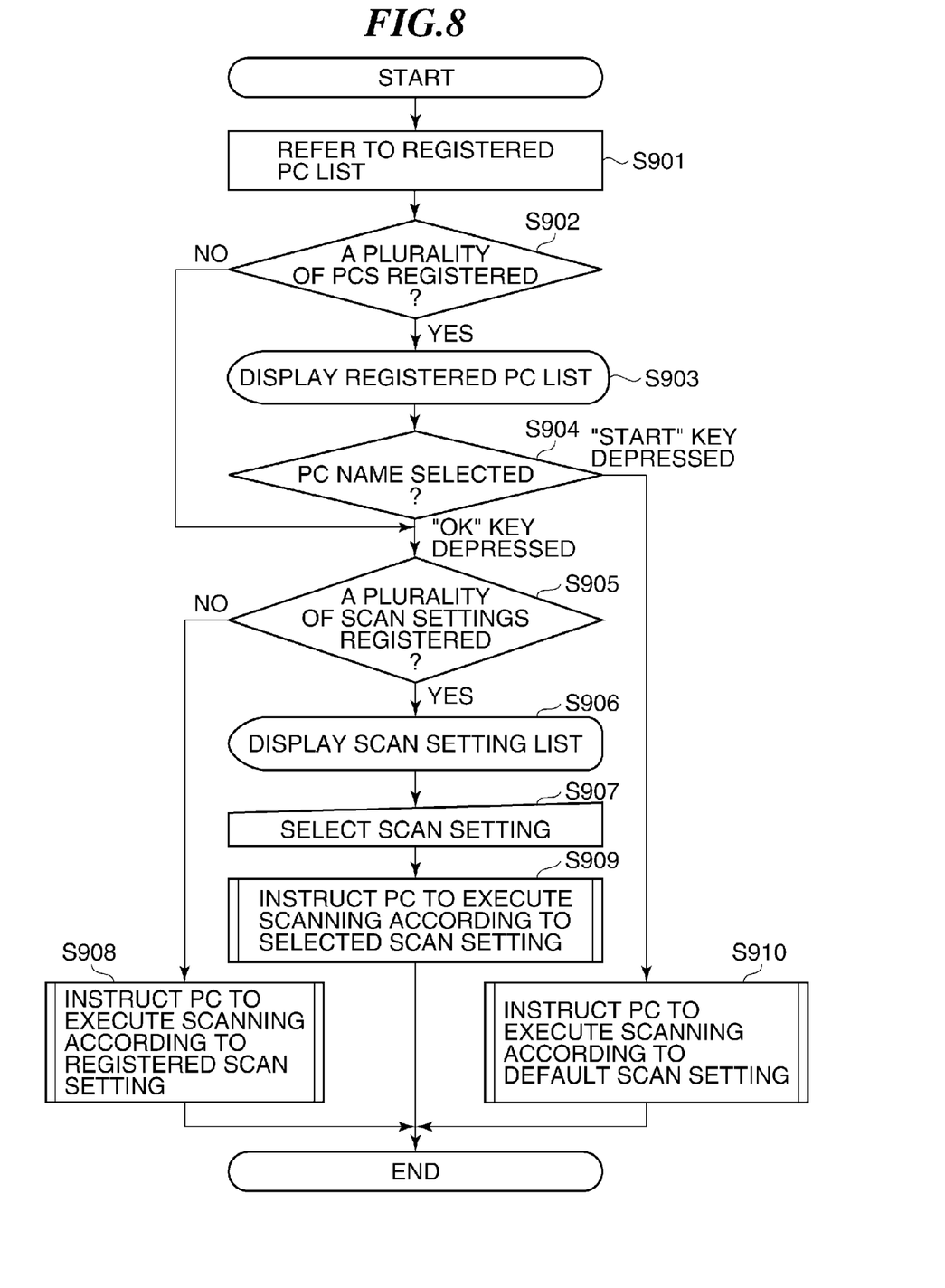
FIG. 8 is a flowchart of a scan instructing process executed by the MFP.

Next, a scan instruction process executed by the MFP 101 will be described with reference to FIG. 8. Steps in FIG. 8 are executed by the CPU 180 after a control program stored e.g. in the ROM 95 of the MFP 101 is loaded into a RAM, not shown.

In a step S901, the CPU 180 refers to a host PC name list stored in the MFP 101, and then the process proceeds to a step S902.

In the step S902, the CPU 180 determines whether or not a plurality of host PC names are registered in the host PC name list. If a plurality of host PC names are registered in the host PC name list, the process proceeds to a step S903, whereas if only one host PC name is registered, the process proceeds to a step S905.

In the step S903, the CPU 180 causes a list of registered host PC names to be displayed on the display section 135, as illustrated on the selection screen 810 in FIG. 7, and prompts the user to select a host PC name from the screen 810 by a key operation on the operation and display section 150, and then the process proceeds to a step S904.

In the step S904, if the CPU 180 determines that the user has pressed an OK key, not shown, to finalize the host PC name (811 or 812) selected by operating the operation and display section 150, the process proceeds to the step S905. On the other hand, if the CPU 180 determines that the user has selected the host PC name (811 or 812) by operating the operation and display section 150 on the screen 810 and then pressed a start key, not shown, the process proceeds to a step S910.

In the step S910, the CPU 180 selects, as a default, a scan setting associated with a button which is the smallest in number assigned thereto of all the custom scan buttons 502 to 505, appearing in FIG. 4, which are registered in the post PC having the host PC name selected in the step S904. Then, the CPU 180 sends a scan setting name associated with the scan setting and a scan execution instruction to the host PC 103 to instruct the same to execute scanning using the default scan setting, followed by terminating the present process.

In the step S905, the CPU 180 determines whether or not there are a plurality of scan setting names registered in the host PC. If a plurality of scan setting names are registered, the process proceeds to a step S906, whereas if only one scan setting name is registered, the process proceeds to a step S908.

In the step S908, the CPU 180 sends the scan setting name and a scan execution instruction to the host PC 103 to instruct the same to execute scanning using only one scan setting registered in the host PC 103, followed by terminating the present process.

In the step S906, the CPU 180 displays the registered scan setting names on the display section 135 as illustrated on the screen 820 in FIG. 7, and the process proceeds to a step S907.

In the step S907, when the user presses the OK key to finalize the scan setting name selected by operating the operation and display section 150, the process proceeds to a step S909.

In the step S909, the CPU 180 sends the scan setting name and a scan execution instruction to the host PC 103 to instruct the same to execute scanning using a scan setting associated with the scan setting name finalized in the step S907, followed by terminating the present process.

It should be noted that the steps S903, S904, S906, S907, and S909 are examples of processing executed by a first display unit, a first finalizing unit, a second display unit, a second finalizing unit, and a first transmission unit, respectively.

Figure 9:
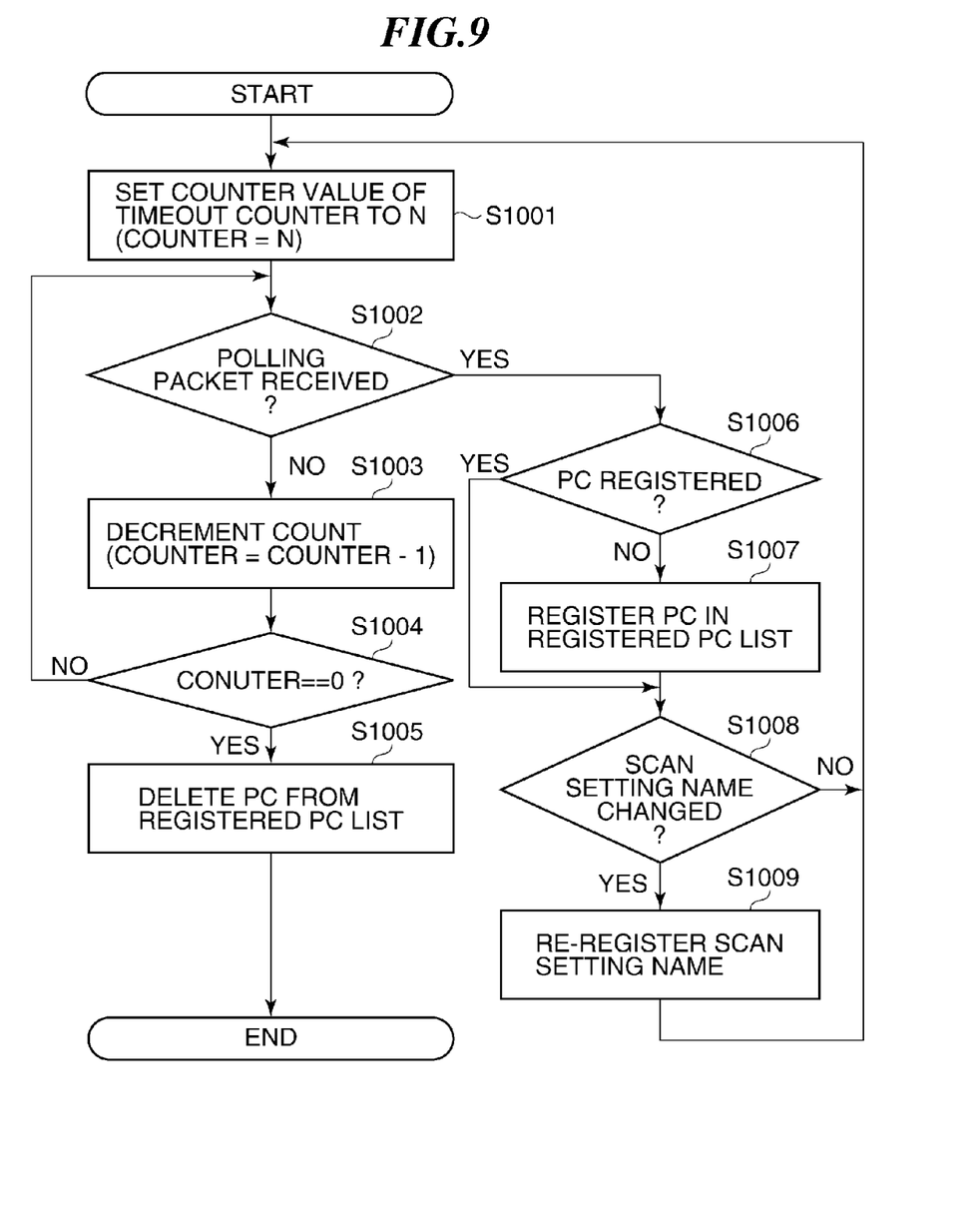
FIG. 9 is a flowchart of a registered host PC list-updating process executed by the MFP.

FIG. 9 is a flowchart of a registered host PC list-updating process executed by the MFP 101. Steps in FIG. 9 are executed by the CPU 180 after a control program stored e.g. in the ROM 95 of the MFP 101 is loaded into the RAM, not shown.

In a step S1001, the CPU 180 sets a counter value for monitoring timeout of a polling from the host PC 103 to a predetermined timeout time period value N, followed by the process proceeding to a step S1002.

In the step S1002, the CPU 180 determines whether or not a polling packet has been received from the host PC 103. If the polling packet has been received, the process proceeds to a step S1006, whereas if not, the process proceeds to a step S1003.

In the step S1003, the CPU 180 has not received a polling packet, and hence the counter value for monitoring polling timeout is decremented (counter value=counter value−1), and then the process proceeds to a step S1004.

In the step S1004, the CPU 180 checks whether or not the counter value is equal to 0. If the counter value is not equal to 0, the CPU 180 judges that communication with the host PC 103 has not timed out yet, and the process returns to the step S1002. On the other hand, if the counter value is equal to 0, the CPU 180 judges that communication with the host PC 103 has timed out, and the process proceeds to a step S1005.

In the step S1005, the CPU 180 deletes the host PC 103 communication with which has timed out, from the registered host PC list, followed by terminating the present process.

In the step S1006, the CPU 180 checks whether or not the host PC 103 having transmitted the polling packet is registered in the registered host PC list. If the CPU 180 determines that the host PC 103 is registered in the registered host PC list, the process proceeds to a step S1008, whereas if not, the process proceeds to a step S1007.

In the step S1007, the CPU 180 registers the host PC name of the unregistered host PC 103 in the registered host PC list based on the polling packet received from the host PC 103, and then the process proceeds to the step S1008.

In the step S1008, the CPU 180 checks whether or not it is notified by the received polling packet that the scan setting name has been changed. In this step, the scan setting name of the host PC 103 registered anew in the step S1007 is also checked in the same manner.

If the scan setting name has not been changed, the process returns to the step S1001, wherein the timeout counter value is initialized so as to continue the present process. On the other hand, if the scan setting name has been changed, the process proceeds to a step S1009.

In the step S1009, the CPU 180 re-registers the scan setting name, and then the process returns to the step S1001, wherein the timeout counter value is initialized so as to continue the present process.

Figure 10:
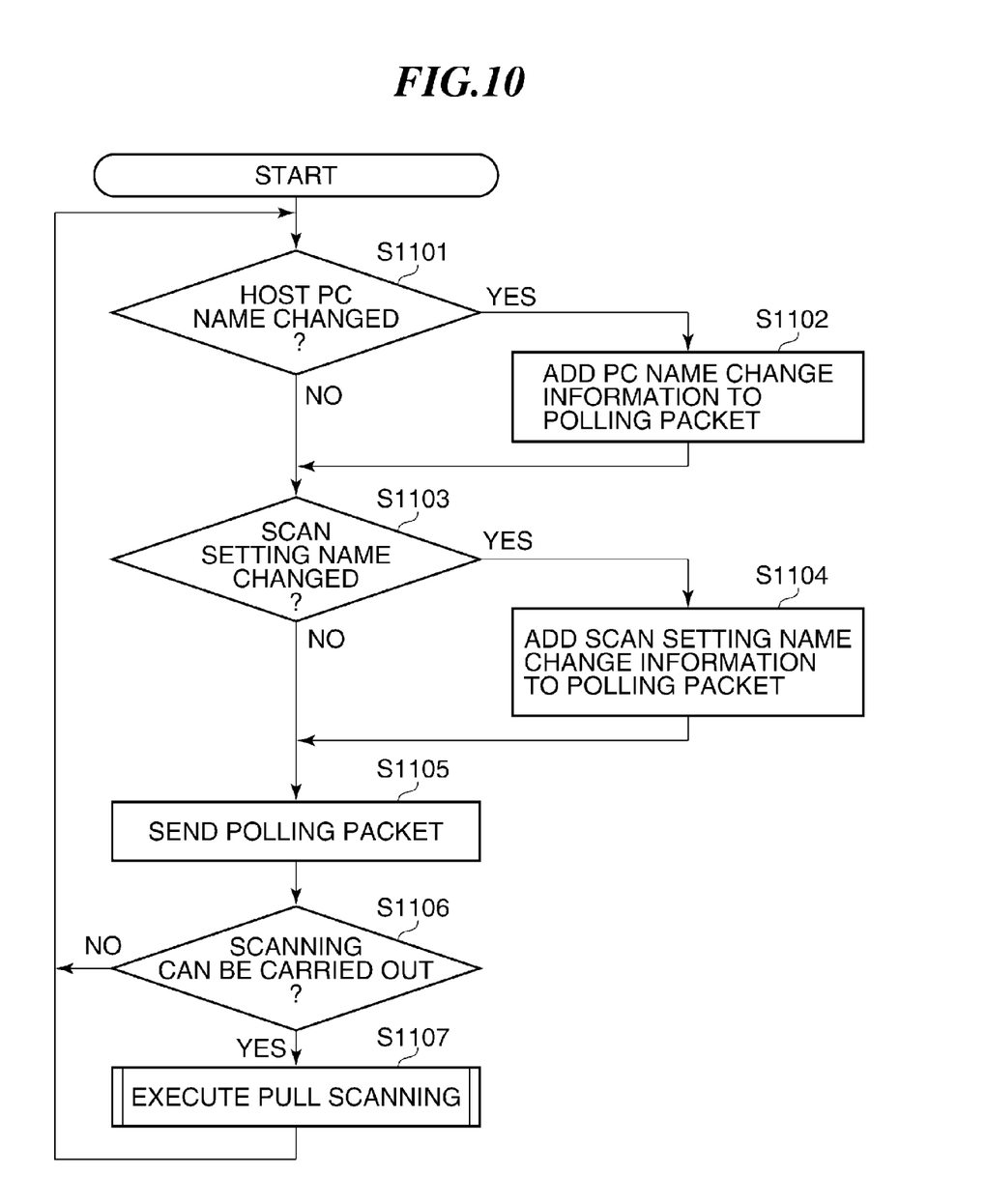
FIG. 10 is a flowchart of a scan execution process executed by the host PC.

Next, a scan execution process executed by the host PC 103 will be described with reference to FIG. 10. Steps in FIG. 10 are executed by a CPU, not shown, of the host PC 103 after a control program stored in a ROM or a HDD, not shown, of the host PC 103 is loaded into a RAM, not shown.

In a step S1101, the CPU checks whether or not a host PC name to be set in the MFP 101 has been changed. If the host PC name has been changed, the process proceeds to a step S1102, whereas if not, the process proceeds to a step S1103.

In the step S1102, the CPU adds information on the changed host PC name to a polling packet, and then the process proceeds to the step S1103.

In the step S1103, the CPU checks whether or not any scan setting name registered in the host PC 103 has been changed. If there is any changed scan setting name, the process proceeds to a step S1104, whereas if not, the process proceeds to a step S1105.

In the step S1104, the CPU adds information on the changed scan setting name(s) to the polling packet, and then the process proceeds to the step S1105.

In the step S1105, the CPU sends the generated polling packet to the MFP 101, and then the process proceeds to a step S1106.

In the step S1106, the CPU receives from the MFP 101 the response information 703 or 705 as a response to the transmitted polling packet 702 or 704 (see FIG. 6), and checks, based on the received response information, whether or not it is possible to carry out scanning. If it is impossible to carry out scanning, the process returns to the step S1101, whereas if it is possible, the process proceeds to a step S1107.

In the step S1107, the CPU executes pull scanning using the scan setting designated by the MFP 101. Then, the CPU returns to the step S1101 and continues the present process.

As described above, in the present embodiment, a plurality of scan settings stored in the host PC 103 are made selectable from a screen on the display section 135 of the MFP 101 such that scanning of an original can be performed based on a selected scan setting. Further, the host PC 103 periodically sends scan setting information (polling packet) to the MFP 101, so that whenever a scan setting is changed, the user does not have to manually change the scan setting stored in the MFP 101 by operating the same.

The present invention is by no means limited to the above-described embodiment, but it can be practiced in various forms, without departing from the spirit and scope thereof.

Further, the steps of the present invention can be realized by causing the processing unit (CPU or processor) of an image processing apparatus or an information processing apparatus, to execute software (programs) acquired via a network or a storage medium of some kind.

Aspects of the present invention can also be realized by a computer of a system or apparatus (or devices such as a CPU or MPU) that reads out and executes a program recorded on a memory device to perform the functions of the above-described embodiment, and by a method, the steps of which are performed by a computer of a system or apparatus by, for example, reading out and executing a program recorded on a memory device to perform the functions of the above-described embodiment. For this purpose, the program is provided to the computer for example via a network or from a recording medium of various types serving as the memory device (e.g., computer-readable medium).

While the present invention has been described with reference to an exemplary embodiment, it is to be understood that the invention is not limited to the disclosed exemplary embodiment. The scope of the following claims is to be accorded the broadest interpretation so as to encompass all such modifications and equivalent structures and functions.

This application claims the benefit of Japanese Patent Application No. 2009-028531, filed Feb. 10, 2009, which is hereby incorporated by reference herein in its entirety.

What is claimed is:

1. An image processing system that includes an image processing apparatus an information processing apparatus, comprising: the information processing apparatus comprising:
   a registering unit configured to register a first set of scan setting items in association with a first scan setting identifier, and register a second set of scan setting items in association with a second setting identifier;
   a first reception unit configured to receive the first scan setting identifier or the second scan setting identifier transmitted from the image processing apparatus; and
   a first transmission unit configured to transmit, when the first reception unit receives the first scan setting identifier, a scan start instruction including the first set of scan setting items registered in association with the first scan setting identifier to the image processing apparatus, and transmit, when the first reception unit receives the second scan setting identifier, a scan start instruction including the second set of scan setting items registered in association with the second scan setting identifier to the image processing apparatus, and
   the image processing apparatus comprising:
   a display control unit configured to display the first scan setting identifier and the second scan setting identifier;
   a second transmission unit configured to transmit, when the first scan setting identifier displayed by said display control unit is selected, the first scan setting identifier to the information processing apparatus, and transmit, when the second scan setting identifier displayed by said display control unit is selected, the second scan setting identifier to the information processing apparatus;
   a second reception unit configured to receive the scan start instruction transmitted from the information processing apparatus by the first transmitting unit in response to the transmission of the first scan setting identifier or the second scan setting identifier;
   a scanning unit configured to scan an image on an original in accordance with the first set of scan setting items or the second set of scan setting items included in the scan start instruction received by said second reception unit; and
   a third transmission unit configured to transmit image data scanned from the original by the scanning unit to the information processing apparatus.

2. The image processing system according to claim 1, wherein the image processing apparatus further comprises:
   a storage unit configured to store the scan setting identifiers, and
   a changing unit configured to change the scan setting identifiers stored in said storage unit, based on scan setting identifiers periodically transmitted from the information processing apparatus.

3. The image processing system according to claim 2, wherein the image processing apparatus further comprises a deleting unit configured to delete the scan setting identifiers stored in said storage unit, when reception of scan setting identifiers from the information processing apparatus does not occur for a predetermined time period.

4. The image processing system according to claim 1, wherein the image processing apparatus further comprises a monitoring unit configured to monitor communication between the image processing apparatus and the information processing apparatus for determining a state of communication between the image processing apparatus and the information processing apparatus relating to scanning execution.

5. The image processing system according to claim 1, wherein the display control unit displays identification information indicative of the information processing apparatus.

6. The image processing system according to claim 5, wherein said display control unit displays the identification information indicative of the information processing apparatus, transmitted from the information processing apparatus, and displays the first scan setting identifiers and the second scan setting identifiers transmitted from the information processing apparatus, which the identification information selected from the identification information indicates.

7. The image processing system according to claim 1, wherein each of the first set of scan setting items and the second set of scan setting items includes a type of an original for scanning and a resolution of an image to be scanned.

8. An image processing method executed by an image processing apparatus that includes a scanning unit configured to scan an image on an original and an information processing apparatus that registers a first set of scan setting items in association with a first scan setting identifier, and registers a second set of scan setting items in association with a second setting identifier, wherein the image processing apparatus displays the first scan setting identifier and the second scan setting identifier;

the image processing apparatus transmits, when the first scan setting identifier is selected, the first scan setting identifier to the information processing apparatus, and transmits, when the second scan setting identifier is selected, the second scan setting identifier to the information processing apparatus;

the information processing apparatus transmits, when the first scan setting identifier is transmitted, a scan start instruction including the first set of scan setting items registered in association with the first scan setting identifier to the image processing apparatus, and transmits, when the second scan setting identifier is transmitted, a scan start instruction including the second set of scan setting items registered in association with the second scan setting identifier to the image processing apparatus;

the image processing apparatus scans an image on an original in accordance with the first set of scan setting items or the second set of scan setting items included in the transmitted scan start instruction; and the image processing apparatus transmits the image data obtained by the scanning to the information processing apparatus.

9. An image processing apparatus that is capable of communicating with an information processing apparatus that registers a first set of scan setting items in association with a first scan setting identifier, and registers a second set of scan setting items in association with a second setting identifier, comprising:

a display control unit configured to display the first scan setting identifier and the second scan setting identifier;

a first transmission unit configured to transmit, when the first scan setting identifier displayed by said display control unit is selected, the first scan setting identifier to the information processing apparatus, and transmit, when the second scan setting identifier displayed by said display control unit is selected, the second scan setting identifier to the information processing apparatus, a reception unit configured to receive a scan start instruction transmitted from the information processing apparatus in response to the transmission of the first scan setting identifier or the second scan setting identifier, wherein the scan start instruction includes, when the first scan setting identifier is transmitted by said first transmission unit, the first set of scan setting items, and includes, when the second scan setting identifier is transmitted by said first transmission unit, the second set of scan setting items;

a scanning unit configured to scan an image on an original in accordance with the first set of scan setting items or the second set of scan setting items included in the scan start instruction received by said reception unit; and a second transmission unit configured to transmit image data scanned from the original by the scanning unit to the information processing apparatus.

10. The image processing apparatus according to claim 9, wherein the display control unit displays identification information indicative of the information processing apparatus, and displays the first scan setting identifier and the second scan setting identifier when the identification information is selected.

11. The image processing apparatus according to claim 9, wherein each of the first set of scan setting items and the second set of scan setting items includes a type of an original for scanning and a resolution of an image to be scanned.

12. The image processing apparatus according to claim 11, wherein each of the first set of scan setting items and the second set of scan setting items includes a size of the original for scanning.

13. A method of controlling an image processing apparatus that is capable of communicating with an information processing apparatus that registers a first set of scan setting items in association with a first scan setting identifier, and registers a second set of scan setting items in association with a second setting identifier, the method comprising:

a display control step of displaying the first scan setting identifier and the second scan setting identifier;

a first transmission step of transmitting, when the first scan setting identifier displayed by said display control step is selected, the first scan setting identifier to the information processing apparatus, and transmitting, when the second scan setting identifier displayed by said display control step is selected, the second scan setting identifier to the information processing apparatus, a reception step of receiving a scan start instruction transmitted from the information processing apparatus in response to the transmission of the first scan setting identifier or the second scan setting identifier, wherein the scan start instruction includes, when the first scan setting identifier is transmitted by said first transmission step, the first set of scan setting items, and includes, when the second scan setting identifier is transmitted by said first transmission step, the second set of scan setting items;

a scanning step of scanning an image on an original in accordance with the first set of scan setting items or the second set of scan setting items included in the scan start instruction received by said reception step; and a second transmission step of transmitting image data scanned from the original by the scanning step to the information processing apparatus.

14. A non-transitory computer-readable storage medium, storing a program that, when executed by a computer, causes the computer to perform a method of controlling an image processing apparatus that is capable of communicating with an information processing apparatus that registers a first set of scan setting items in association with a first scan setting identifier, and registers a second set of scan setting items in association with a second setting identifier, the method comprising:

a display control step of displaying the first scan setting identifier and the second scan setting identifier;

a first transmission step of transmitting, when the first scan setting identifier displayed by said display control step is selected, the first scan setting identifier to the information processing apparatus, and transmitting, when the second scan setting identifier displayed by said display control step is selected, the second scan setting identifier to the information processing apparatus, a reception step of receiving a scan start instruction transmitted from the information processing apparatus in response to the transmission of the first scan setting identifier or the second scan setting identifier, wherein the scan start instruction includes, when the first scan setting identifier is transmitted by said first transmission step, the first set of scan setting items, and includes, when the second scan setting identifier is transmitted by said first transmission step, the second set of scan setting items;

a scanning step of scanning an image on an original in accordance with the first set of scan setting items or the second set of scan setting items included in the scan start instruction received by said reception step; and a second transmission step of transmitting image data scanned from the original by the scanning step to the information processing apparatus.

* * * * *